…

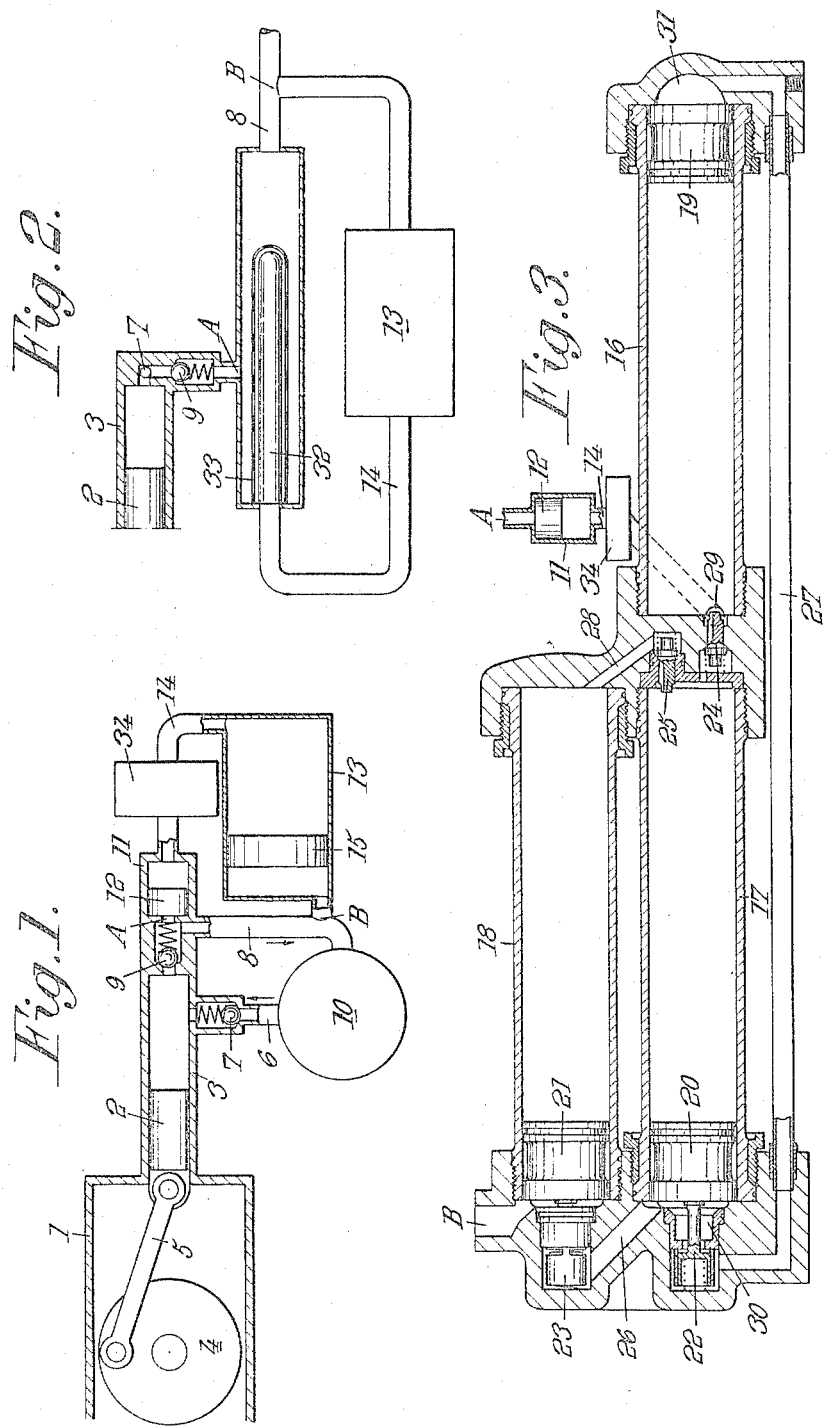

United States Patent Office 3,289,406
Patented Dec. 6, 1966

3,289,406
HYDRAULIC TRANSMISSION DEVICES
Paul Panhard, Paris, France, assignor to Societe Anonyme Andre Citroen, Paris, France, a society of France
Filed Apr. 23, 1965, Ser. No. 450,474
Claims priority, application France, Apr. 24, 1964, 972,337
5 Claims. (Cl. 60—51)

The present invention relates to hydraulic transmission devices having a variable ratio of transmission and comprising, on the one hand, a hydraulic pump working in a cyclical manner and having a flow rate variable during every cycle, said pump comprising, in particular, at least one piston and cylinder unit, and on the other hand, a receiver machine, such for instance as a rotary motor, fed by said pump. This invention is more especially, but not exclusively concerned with devices of this kind acting as change speed devices in automobile vehicles.

The chief object of the present invention is to provide a device of the above mentioned kind which is better adapted to meet the requirements of practice, in particular in that the volume of liquid subjected to the cyclical flow rate variations is reduced to a minimum.

The essential feature of the present invention consists in providing, in such a device, a variable volume container, a deformation portion of the wall of which is located in close proximity to the output of the pump, or is connected to this output through conduit means independent of the conduit means that connect the pump with the receiver machine, said container being filled with a gaseous fluid subjected at any time to the mean pressure produced at the same time in said device at the inlet of the receiver machine, for which purpose, preferably, another deformable portion of the wall of the container is directly connected to said inlet or to a portion of the device close to this inlet.

Other features of the present invention will appear in the course of the description of some embodiments thereof.

Preferred embodiments of the present invention will be hereinafter described with reference to the appended drawings, given merely by way of example, and in which:

FIG. 1 is a diagrammatical view of a hydraulic transmission device according to the present invention;

FIG. 2 diagrammatically shows in axial section, a modification of a portion of this device; and FIG. 3 is an axial section of still another modification.

It should be remembered that in hydraulic transmission devices of the kind with which the present invention is concerned, the delivery flow rate of the pump is not uniform but undergoes cyclical variations due to the fact that every piston and cylinder unit of the pump has a flow rate which varies between zero and a maximum during every cycle.

Now it is desirable to feed the receiver machine with a flow rate as uniform as possible.

For this purpose, it has already been proposed to connect with at least one of the feed and delivery conduits extending between the pump and the receiver machine an element generally called "flow rate regulator" or "antipulsating device." This element is advantageously a hydraulic-pneumatic accumulator comprising for instance a piston freely slidable in a closed cylinder connected with said conduit, the space between this piston and the closed end of the cylinder being filled with a compressed gas which forms a pneumatic cushion. It will be understood that, with such an apparatus, when the pressure to be made uniform increases above the initial pressure of the cushion, the piston moves into the cylinder and further compresses the pneumatic cushion until a balanced position is reached.

In order to permit regulation over a large range of pressures while avoiding the use of a cylinder of prohibitive volume and weight, it has been proposed, in the French Patent No. 1,350,878 filed December 21, 1962, in the name of the Societe Anonyme des Anciens Etablissements Panhard & Levassor for Improvements Brought to Variable Ratio Hydraulic Transmission Plants, in Particular for Automobile Vehicles, to replace the single antipulsating device by at least two independent antipulsating devices having different initial pressures of inflation such that said antipulsating devices enter into action only one after the other when the pressure to be made uniform increases from its minimum value to its maximum value. These antipulsating elements were all connected to different portions of the delivery pipe of the pump extending toward the receiver machine. Consequently, at least for some conditions of operation, the amount of liquid undergoing pulsation was important, which could involve serious drawbacks concerning the noise of operation, the mechanical stresses developed in the system, and its efficiency.

All these drawbacks are eliminated according to the present invention by applying the antipulsating effect directly to the outlet of the pump and by automatically making the compensating efficiency of this effect proportional to the mean presure effectively produced in the system.

Furthermore, according to a preferred embodiment of the invention, the single antipulsating device consists of a hydraulic-pneumatic accumulator having several successive stages, which permits of greatly reducing the volume and weight of this device while accelerating its response to variations of the mean pressure to be made as uniform as possible.

The general structure of the plant, with the exception of the antipulsating device to be provided at the outlet of the pump, may be of any suitable kind and for instance such as disclosed in the French patent application filed December 15, 1962, in the name of the Societe Anonyme des Anciens Etablissements Panhard & Levassor for Improvements Brought to Variable Ratio Hydraulic Transmission Plant, in Particular for Automobile Vehicles.

The system comprises:

A pump 1 constituted by a piston 2 slidable in a cylinder 3 and to which a reciprocating movement is imparted by a crank disc 4 through a connecting rod 5, the pumped liquid being sucked into cylinder 3 from a conduit 6 past a suction valve 7 and delivered into a delivery conduit 8 through a delivery valve 9; and A receiver machine 10 consisting of a hydraulic motor, fed with the liquid delivered through conduit 8, the liquid that flows out from said machine 10 returning to the pump through conduit 6.

According to the present invention, the space filled with gaseous fluid under pressure has two movable or deformable wall portions subjected, respectively, to the pressure in conduit 8 at A, just downstream of delivery valve 9, and to the pressure in conduit 8 at B, just upstream of receiver machine 10.

In a first embodiment of the invention, illustrated by FIG. 1, said space filled with gaseous fluid under pressure comprises a small cylinder 11, in which can move a very light weight small piston 12 constituting the first movable wall portion, connected through a conduit 14 and a chamber 34 with a big cylinder 13, a piston 15 freely slidable in said cylinder 13 constituting the second movable wall portion.

The space existing between pistons 12 and 15 is filled with a gaseous fluid under pressure and the minimum value of the volume (of this space when piston 15 is wholly driven into its cylinder toward the right of FIG. 1) is chosen in such manner that its relative variation under the effect of the displacements of piston 12 does not exceed a predetermined limit. For instance, if the maximum displacement of piston 12 with respect to its mean position produces a volume variation of ±2 cm.$^3$, the minimum volume of the above mentioned gaseous fluid deformable space (then reduced to conduit 14 and capacity 34) may be given a value of 60 cm.$^3$, the corresponding maximum relative volume variation of said gaseous fluid deformable space being approximately of ±3%.

If the limits between which the value of the mean pressure to be regulated are very different from each other, the dimensions of cylinder 13 may become very important. If, for instance, in the case above mentioned, the mean pressure to be regulated must be able to pass from 7.5 to 480 kg./cm.$^2$, the internal volume of cylinder 13 must be about 64 times greater than the minimum volume above indicated, that is to say of about four liters.

It will be easily understood that such a system is hardly applicable for practical purposes, for instance for the change speed device of an automobile vehicle, due to the fact not only of its volume but also of the slow rate of response thereof.

As a matter of fact, with dimensions as above mentioned, if pump 1 comprises four pistons 2 opposed two by two, displacing, for every revolution, a total amount of 36 cm.$^3$ of liquid during their reciprocating strokes, pistons 12 (the number of which is four but which work two by two, since the deliveries of two opposed pistons take place at time intervals corresponding to half a cycle) should displace ±4 cm.$^3$ and, for a precision of regulation of the delivery pressure variations equal to ±3%, the total volume of the gaseous fluid deformable space (located in the immediate vicinity thereof) should be 120 cm.$^3$, and the volume displaced by piston 15, which is sixty-four times greater, will be nearly equal to 8 liters (to be accurate 7.68 liters). Therefore several hundreds of revolutions of the pump (to be accurate 7680/36 that is to say 213 revolutions) will be necessary for moving in piston 15 as far as its position corresponding to the starting maximum pressure, a condition which cannot be accepted (one hundred revolutions corresponding to 1.5 seconds for a speed of revolution of the driving shaft of 4000 revolutions per minute).

In order to obviate this drawback it is advantageous to replace the single accumulator 15–13 by several much smaller accumulators, which permits reducing the above mentioned delay of response by dividing it for instance by 7.

In the embodiment of the invention which will now be described with reference to FIG. 3, cylinder 13 is replaced by three cylinders 16, 17 and 18, of small volume, wherein are disposed slidable pistons 19, 20 and 21. In the state of rest, these three cylinders contain air compressed under three different respective pressures $p_1$, $p_2$ and $p_3$, $p_1$ being lower than $p_2$, which is itself lower than $p_3$. The pressure of the liquid at B is applied to the left face of piston 21.

The pressure of the liquid at A is transmitted, through piston 12, to the air present in cylinder 11 which itself communicates through a conduit 14 with a point 29 of cylinder 16 which remains always cleared by piston 19 even at the end of the leftward stroke thereof.

When piston 21 is at the end of its leftward stroke, it opens valve 23 and the pressure of the liquid at B is transmitted to the left face of piston 20.

When piston 20 is at the end of its leftward stroke, it opens valve 22 and the pressure of the liquid at B is transmitted through a conduit 27 to the right face of piston 19.

Check valve 24 is adapted to prevent the flow of air from cylinder 17 into cylinder 16. But when piston 19 reaches the end of its leftward stroke, it opens said check valve 24.

Check valve 25 is adapted to prevent the flow of air from cylinder 18 into cylinder 17. But when piston 20 reaches the end of its rightward stroke, it opens said check valve 25.

The operation is as follows:

It is supposed that the volume available for air in each of the cylinders 16, 17 and 18 is 360 cm.$^3$ (the "minimum" volume, above referred to, of the gaseous fluid deformable space being, in this case also, 120 cm.$^3$) and that pressures $p_1$ $p_2$, $p_3$ respectively 7.5, 30 and 120 kg./cm.$^2$.

Initially, the hydraulic pressure at B is lower than 7.5 kg./cm.$^2$. Piston 21 keeps check valve 23 away from its seat, which connects inlet B, through conduit 26, with a small chamber 30 located between piston 20 and valve 22. But this valve 22 being itself kept away from its seat by piston 20, this chamber 30 is connected through conduit 27 with a chamber 31 limited by piston 19 which is at the right hand end of cylinder 16. Check valves 24 and 25 are applied against their seats. Cylinder 16, filled with compressed air, communicates with conduit 14 at point 29.

It will be supposed (the vehicle just starting) that the pressure at B rises. As soon as this pressure reaches 7.5 kg./cm.$^2$, piston 19 moves toward the left, the pressure existing in cylinder 16 and therefore in conduit 14 the cylinder 11 being then permanently equal to the pressure at B.

At the end of the leftward stroke of piston 19, the volume of the deformable space 16–14–11, which was initially equal to 360+120, i.e. 480 cm.$^3$, is reduced to 120 cm.$^3$ so that the pressure therein has become equal to 7.5×480/120, i.e. 30 kg./cm.$^2$, that is to say equal to that existing in cylinder 17. Piston 19 then moves valve 24 away from its seat, thus connecting cylinder 17 with conduit 14 at 29.

If the pressure at B keeps increasing, piston 20 is pushed by the liquid toward the right, which causes valve 22 to close. At the end of the stroke toward the right of piston 20, the pressure existing in cylinder 11 has become equal to 120 kg./cm.$^2$. Valve 25 is then moved away from its seat by said piston 20, thus connecting cylinder 18 with cylinder 11 through conduit 28 and valves 25 and 24.

If the pressure B further increases, piston 21 is moved toward the right and causes valve 23 to be closed. The pressure at B can thus be regulated up to a value of 480 kg./cm.$^2$.

If, starting from this high value, the pressure of the liquid flowing at B decreases, only piston 21 returns toward its initial position, valves 22 and 23 being closed. Piston 20 starts on its leftward stroke only when piston 21 has reached the end of its leftward stroke and has therefore reopened valve 23. As soon as this return movement of piston 20 started, check valve 25 returned into closed position, and a mass of air compressed at 120 kg./cm.$^2$ was entrapped in cylinder 18.

In a like manner, piston 19 can begin to move toward the right only after piston 20 has reached the end of its leftward stroke, thus opening valve 22. Check valve 24 closes as soon as piston 19 begins to move toward the right, which entraps in cylinder 17 a mass of air compressed at 30 kg./cm.$^2$.

It will be seen that, instead of a volume of about ten liters necessary with the construction of FIG. 1, it is sufficient, with the construction of FIG. 3, to dispose of a volume of 3×0.36=1.08 liter to pass from 7.5 to 480 kg./cm.$^2$.

This arrangement is very advantageous, not only because the dimensions are much smaller than in the case of FIG. 1 but also because the maximum time of response is considerably shorter and generally below one second.

Of course one of the deformable wall portions of the space in which air is enclosed may consist of an element other than a movable piston, for instance a flexible and fluid-tight diaphragm in particular in the form of a bag, which may be housed in a perforated rigid jacket. Thus, in the modification illustrated by FIG. 2 small piston 12 has been replaced by such a diaphragm 32 located in a perforated rigid casing 33.

In a general manner, while the above description discloses what is deemed to be practical and efficient embodiments of the present invention, said invention is not limited thereto as there might be changes made in the arrangement, disposition and form of the parts without departing from the principle of the invention as comprehended within the scope of the appended claims.

What I claim is:
1. A hydraulic transmission device which comprises, in combination:
   a hydraulic pump having a cyclically variable instantaneous delivery rate, said pump having an input and an output,
   a hydraulic receiver having an input and an output,
   a conduit connecting the input of said receiver with the output of said pump,
   means for connecting the output of said receiver with the input of said pump,
   means forming a closed space, said means including a deformable wall forming a partition between the inside of said space and the portion of said conduit adjoining the output of said pump,
   said means including another deformable wall forming a partition between the inside of said space and the portion of said conduit adjoining the input of said receiver,
   said space being filled with a gaseous fluid.
2. A device according to claim 1 wherein said means forming a closed space include a cylindrical element and at least one of said deformable walls consists of a piston freely slidable in said cylindrical element.
3. A device according to claim 1 wherein at least one of said deformable walls consists of a flexible resilient bag.
4. A hydraulic transmission device which comprises, in combination,
   a hydraulic pump having a cyclically variable delivery rate, said pump having an input and an output,
   a hydraulic receiver having an input and an output,
   a transmission conduit connecting the input of said receiver with the output of said pump,
   means for connecting the output of said receiver with the input of said pump,
   means forming a closed space filled with a gaseous fluid and including at least two containers, a first one and a second one, and a deformable chamber communicating with said first container,
   said deformable chamber being interposed between a first end of said first container and the portion of said transmission conduit into which opens the output of said pump, the pressure, at rest, of the gaseous fluid in said first container having a first value, the pressure, at rest, of the gaseous fluid in said second container having a second value higher than said first value,
   a first deformable wall freely movable in said first cylinder,
   a conduit between said first end of said first container and a first end of said second container,
   a check valve in said last mentioned conduit biased to open in response to the hydraulic pressure in said first container becoming equal to the hydraulic pressure in said second container,
   a first liquid conduit portion extending between the second ends of said two containers,
   a second liquid conduit portion between the second end of said second container and the portion of said transmission conduit where it opens into said hydraulic receiver,
   a second deformable wall freely movable in said second container, and
   check valve means for cutting off the communication between said two liquid conduit portions, operative by said second deformable wall for opening this communication when said second deformable wall occupies the position where it is at the second end of said second container.
5. A hydraulic transmission device which comprises, in combination,
   a hydraulic pump having a cyclically variable delivery rate, said pump having an input and an output,
   a hydraulic receiver having an input and an output,
   a transmission conduit connecting the input of said receiver with the output of said pump,
   means for connecting the output of said receiver with the input of said pump,
   means forming a closed space filled with a gaseous fluid and including at least two cylinders, a first one and a second one, and a deformable chamber communicating with said first cylinder,
   said deformable chamber being interposed between a first end of said first cylinder and the portion of said transmission conduit into which opens the output of said pump, the pressure, at rest, of the gaseous fluid in said first cylinder having a first value, the pressure, at rest, of the gaseous fluid in said second cylinder having a second value higher than said first value,
   a first piston freely slidable in said first cylinder,
   a conduit between said first end of said first cylinder and a first end of said second cylinder,
   a check valve in said last mentioned conduit biased to open in response to the hydraulic pressure in said first cylinder becoming equal to the hydraulic pressure in said second cylinder,
   a first liquid conduit portion extending between the second ends of said two cylinders,
   a second liquid conduit portion between the second end of said second cylinder and the portion of said transmission conduit where it opens into said hydraulic receiver,
   a second piston freely slidable in said second cylinder, and
   check valve means for cutting off the communication between said two liquid conduit portions, operative by said second piston for opening this communication when said second piston occupies the position where it is at the second end of said second cylinder.

References Cited by the Examiner
UNITED STATES PATENTS 2,602,434  7/1952  Barnaby _____ 60—54.5 X
2,721,446  10/1955  Bumb _____ 60—51

EDGAR W. GEOGHEGAN, *Primary Examiner.*